United States Patent
Smith et al.

(10) Patent No.: US 8,874,916 B2
(45) Date of Patent: Oct. 28, 2014

(54) INTRODUCTION OF DISCRETE ROOTS OF TRUST

(71) Applicant: Intel Corporation, Santa Clara, CA (US)

(72) Inventors: Ned Smith, Hillsboro, OR (US); Sharon Smith, DuPont, WA (US); Willard Wiseman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 13/629,887

(22) Filed: Sep. 28, 2012

(65) Prior Publication Data

US 2014/0095876 A1    Apr. 3, 2014

(51) Int. Cl.
*H04L 29/06* (2006.01)
*H04L 9/32* (2006.01)
*G06F 21/57* (2013.01)

(52) U.S. Cl.
CPC . *G06F 21/57* (2013.01); *H04L 9/32* (2013.01)
USPC ............................. 713/171; 726/26; 380/284

(58) Field of Classification Search
CPC ............ G06F 21/10; G06F 21/57; H04L 9/32
USPC ............................. 713/171; 726/26; 380/284
See application file for complete search history.

(56) References Cited

U.S. PATENT DOCUMENTS

| | | | |
|---|---|---|---|
| 2007/0101156 A1* | 5/2007 | Novoa et al. | 713/190 |
| 2009/0327684 A1* | 12/2009 | Zimmer et al. | 713/2 |
| 2012/0297200 A1* | 11/2012 | Thom et al. | 713/189 |

* cited by examiner

*Primary Examiner* — Hadi Armouche
*Assistant Examiner* — Dao Ho
(74) *Attorney, Agent, or Firm* — Jordan IP Law, LLC

(57) ABSTRACT

Systems and methods may provide introducing a first root of trust on a platform to a second root of trust on the same platform. In one example, the method may include using an authenticated code module to transfer a first encryption key from a first root of trust on a platform to a second root of trust on the platform, receiving a challenge response from the first root of trust at the second root of trust, and using the first encryption key to verify the challenge response.

15 Claims, 5 Drawing Sheets

INTRODUCTION OF DISCRETE ROOTS OF TRUST

BACKGROUND

1. Technical Field

Embodiments generally relate to introduction of discrete roots of trust. More particularly, embodiments relate to introducing a first root of trust on a platform to a second root of trust on the same platform.

2. Discussion

In some instances, a platform may be configured to use more than one root of trust. For example, a first security module, representing a first root of trust, may be integrated into a platform for a first purpose, while a second security module, representing a second root of trust, may be integrated into the platform for a second purpose. In such a case, these two security modules may often be unable to communicate directly, and may be mutually suspicious.

Moreover, if the first security module includes additional security logic, the second security module may regard the additional security logic as a separate discrete component with unknown security attributes.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
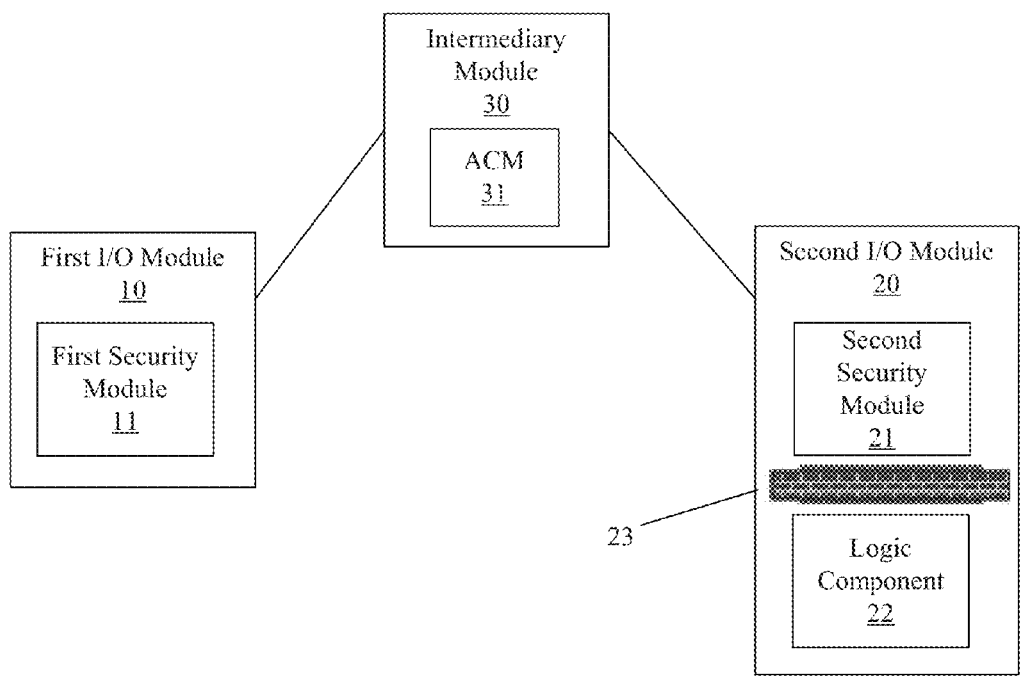
FIG. 1 is a block diagram of an example of a system including a first root of trust and a second root of trust according to an embodiment.

FIG. 1 is a block diagram of an example of a system 500 including a first root of trust and a second root of trust. More particularly, the illustrated system 500 includes a first input/output (I/O) module 10, a second I/O module 20, and an intermediary module 30. The first I/O module 10 may include a first security module 11. The first security module 11 may be configured to operate as a first root of trust for a platform.

The second I/O module 20 may include a second security module 21 and a logic component 22, wherein the second security module 21 may be configured to operate as a second a root of trust for the platform. The logic component 22 may be a discrete security component configured to operate in conjunction with the second security module 21 (e.g., as a value added component). The second security module 21 and the logic component 22 may be separated by a firewall 23.

The intermediary module 30 may be a component configured to, among other things, act as an intermediary between the first I/O module 10 and the second I/O module 20. The intermediary module 30 may include an authenticated code module (ACM) 31. As will be discussed in greater detail, the ACM 31 may facilitate a trusted execution environment, allowing the ACM 31 to operate without threat from malware that may be present in memory components on the platform. In addition, the intermediary module 30 may be configured to facilitate an introduction of the first security module 11 (e.g., the first root of trust) to the second security module 21 (e.g., the second root of trust).

Figure 2:
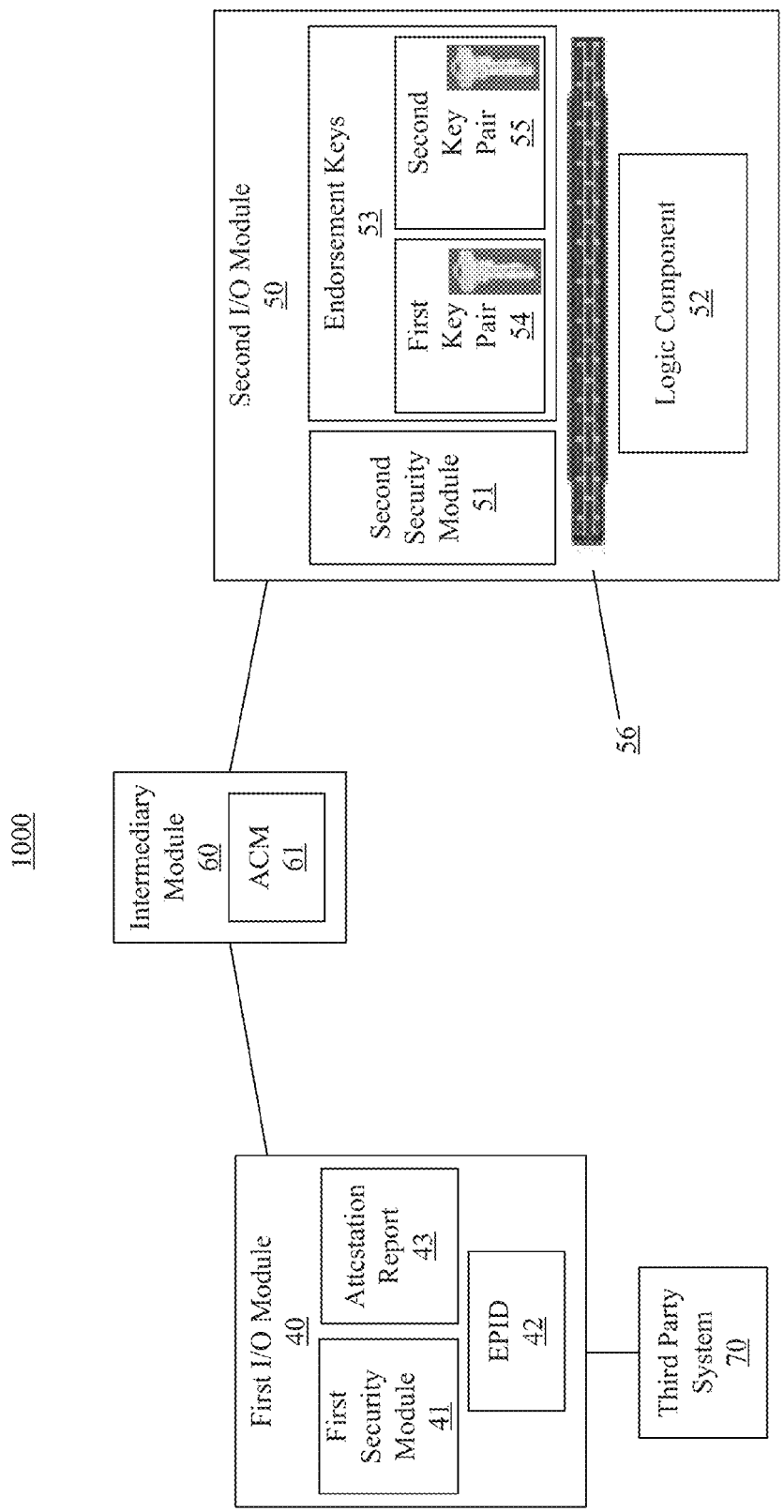
FIG. 2 is a block diagram of an example of a system configured to facilitate verification by a third party that a first root of trust and a second root of trust operating on a platform have been introduced according to an embodiment.

FIG. 2 is a block diagram of an example of a networking architecture 1000 configured to facilitate verification by a third party that a first root of trust and a second root of trust operating on a platform have been introduced. In particular, as will be discussed in greater detail, the architecture 1000 may be enable a first root of trust to provide proof (i.e., cryptographic evidence) to the third party that the first root of trust and the second root of trust are operating together on the same platform, and within a trusted execution environment. The architecture 1000 may include a third party system 70 and a platform 63 having a first I/O module 40, a second I/O module 50 and an intermediary module 60.

In this example, the first I/O module 40 may include a first security module 41, an enhanced privacy identifier (EPID) 42, and an attestation report 43. The first security module 41 may be configured to operate as a first root of trust for the platform 63. The EPID 42 may be used to identify the first security module 41 as a root of trust. The attestation report 43 may be used to, among other things, provide proof (i.e., cryptographic evidence) that the first security module 41 may be operating with a second security module on the same platform 63, and within a trusted execution environment.

The second I/O module 50 may include a second security module 51 and logic component 52. The second security module 51 may be configured to operate as a second root of trust for the platform. The logic component 52 may be a discrete security component configured to operate in conjunction with the second security module 51. The second security module 51 and the logic component 52 may be separated by a firewall 56.

The second I/O module 50 may also include one or more endorsement keys 53. The endorsement keys 53 may be used in a verification process. The endorsement keys 53 may be embedded by, for example, the manufacturer of the second security module 51. In this example, the endorsement keys 53 may include a first key pair 54 and a second key pair 55.

The first key pair 54 may be used to identify the second security module 51 as the second root of trust. For example, the first key pair 54 may be used in a verification process requested by a third party operating the off-platform third party system 70. The first key pair 54 may include a first public key and a first private key. As will be discussed in greater detail, the first security module 41 may receive and countersign the first public key of the first key pair 54, and then incorporate the countersigned key into the attestation report 43 as part of a process of verifying the identity of the second root of trust. The first private key of the first key pair 54 may remain with the second I/O module (i.e., private), and may be used for attestation to a third party and to establish a secure channel between the logic component 52 and the first IO module 40.

The second key pair 55 may be used during a key exchange process with another root of trust. The second key pair 55 may also include a second public key and a second private key. As will be discussed in greater detail, the second key pair 55 may be used to verify that the second security module 51 is operating as the second root of trust for the platform. Also, the second private key of the second key pair 55 may remain with the second I/O module (i.e., private), and may be used for attestation to a third party and to establish a secure channel between the logic component 52 and the first IO module 40.

In this example, the intermediary module 60 may be a component configured to facilitate an introduction between the first root of trust and the second root of trust. The intermediary module 60 may include ACM 61. As will be discussed in greater detail, the ACM 61 may be configured to use secure communications to introduce a first root of trust to a second root trust by creating a public key provisioning path between both. In this case, the ACM 61 may be configured to introduce the second public key of the second key pair 55 of the second security module 51 to the first security module 41 over one or more trusted paths that may be accessible to the ACM 61.

The third party system 70 may be operated by a third party looking to verify that that the first security module 41 (i.e., the first root of trust) and the second security module 51 (i.e., the second root of trust) are operating together on the same platform 63, and within a trusted execution environment. So, in this example, the third party system 70 may be operated by an electronic commerce (e-commerce) vendor, who is performing a shopping cart transaction implicating the first security module 41 and the second security module 51.

Figure 3:
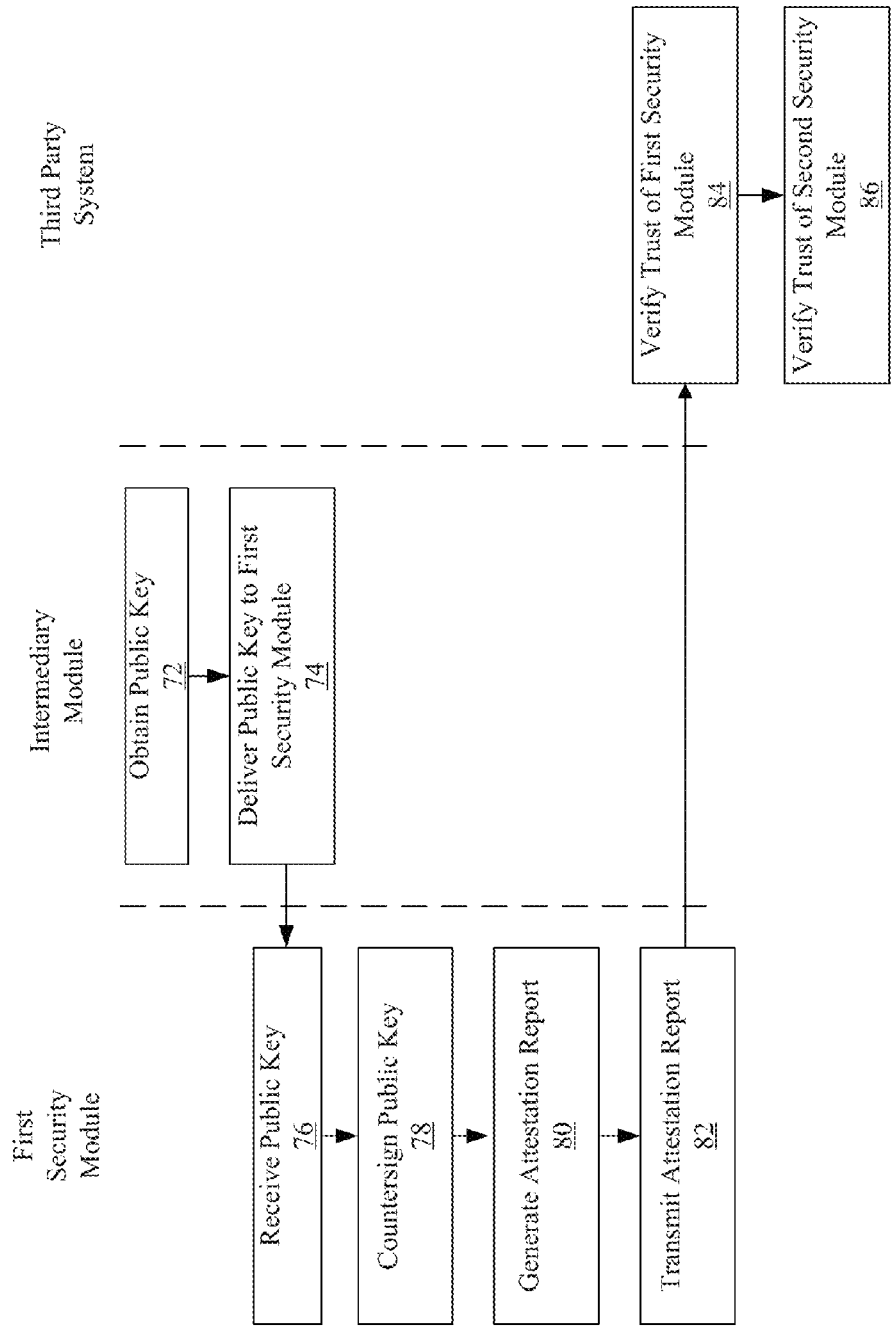
FIG. 3 is a flowchart of an example of a method of verification by a third party that a first root of trust and a second root of trust operating on a platform have been introduced according to an embodiment.

FIG. 3 is a flowchart of an example of a method of verifying by a third party, such as the third party operating the third party system 70 (FIG. 2), that a first root of trust, such as the first security module 41 (FIG. 2), and a second root of trust, such as the second security module 51 (FIG. 2), have been introduced. In this example, the third party system may require proof that the first security module and the second security module are operating together on the same platform, and within a trusted execution environment. An intermediary module may, such as the intermediary module 60 (FIG. 2), be configured to facilitate communication between the first security module and the second security module.

The method might be implemented as a set of logic instructions stored in a machine- or computer-readable storage medium such as, for example, random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as, for example, Java, Smalltalk, C++ or the like and conventional procedural programming languages, such as the "C" programming language or similar programming languages.

At processing block 72, the intermediary module may use an ACM, such as the ACM 61 (FIG. 2), to obtain a public key, such as the second public key of the second key pair 55 (FIG. 2), from the second security module. At processing module 74, the ACM may securely deliver the public key to the first security module.

At processing block 76, the first security module may receive the public key. At processing block 78, the first security module may use an EPID, such as the EPID 42 (FIG. 2), to countersign the public key from the second security module as part of an attestation process.

At processing block 80, the first security module may generate an attestation report, such as the attestation report 43 (FIG. 2), wherein the attestation report may include the EPID, the public key countersigned with the EPID, and an identification (e.g., a component ID, etc.) of the first security module that includes the make, model, version and cryptographic hash of the firmware contained in the first security module. At processing block 82, the first security module may transmit the attestation report to the third party for verification.

At processing block 84, the third party system may use the EPID to verify that the first security module may be trusted. At processing block 86, the third party system may use the attestation report (including the public key countersigned with the EPID) to verify that a separate attestation report obtained directly from the second security module may be trusted. In particular, the third party system may do so by determining from the attestation report that the first security module and the second security module have been introduced, that the second security module has authorized the first security module to countersign its public key, and that both are operating together in a trusted environment (i.e., a shared root of trust) facilitated by the intermediary module 60.

Figure 4:
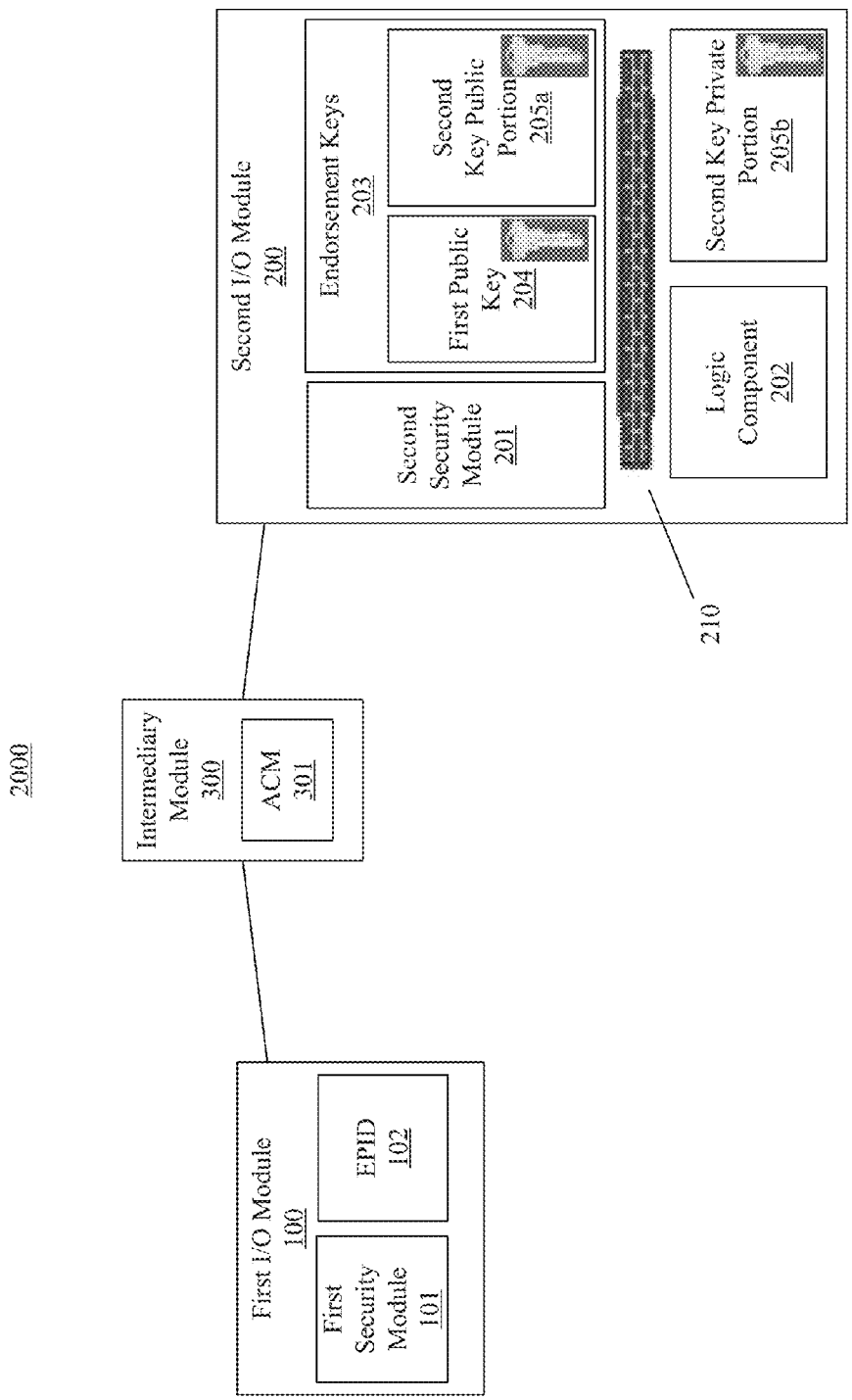
FIG. 4 is a block diagram of an example of a system configured to facilitate introduction of a first root of trust to a second root of trust including a discrete security component according to an embodiment.

FIG. 4 is a block diagram of an example of a system configured to dynamically introducing a first root of trust and a second root of trust. In particular, as will be discussed in greater detail, the system 2000 may be configured to enable introduction of a first root of trust and a second root of trust, wherein the second root of trust may be integrated with a discrete logic component. FIG. 4 illustrates a system including a first I/O module 100, a second I/O module 200, and an intermediary module 300.

In this example, the first I/O module 100 may include a first security module 101 and an enhanced private identification (EPID) 102. The first security module 101 may be configured to operate as a first root of trust for a platform. The EPID 102 may be used to identify the first security module 101 as a first root of trust.

The second I/O module 200 may include a second security module 201 and a logic component 202. The second security module 201 may be configured to operate as a second root of trust for the platform. The logic component 202 may be a discrete security component configured to operate in conjunction with the second security module 201.

The second security module 201 and the logic component 202 are separated via a firewall 210 in the illustrated example. The firewall 210 may preclude the logic component 202 from sharing the trusted relationships of the second security module 201, and may cause the logic component 202 to be treated with suspicion in instances where the second security module 201 would not.

The endorsement keys 203 may be used in a verification process. The endorsement keys 203 may be embedded by, for example, the manufacturer of the second security module 201. The endorsement keys 203 may include a first public key 204 and a second key public portion 205*a*.

The first public key 204 may be used to identify a second root of trust facilitated by the second security module 201. The second key public portion 205*a* may be used during a key exchange process with another root of trust. The second key public portion 205*a* may be located on a first side of the firewall 210 (i.e., on the side of the second security module 201). The second key public portion 205*a* may correspond to a second key private portion 205*b* (i.e., a private key) located on a second side of the firewall 210 (i.e., on the side of the logic component 202). As will be discussed in greater detail, the symmetry of the second key public portion 205a and the second key private portion 205b may be used to verify a trusted relationship between the second security module 201 and the logic component 202.

The intermediary module 300 may be a component configured to facilitate an introduction between a first root of trust and a second root of trust. The intermediary module 300 may include ACM 301. The ACM 301 may be configured to securely communicate with the first security module 101, and to introduce the second security module 201 to the first security module 101 by creating a public key provisioning path between the two.

For example, the ACM 301 may be configured to access the public key 205a of the second security module 201, and introduce the public key 205a to the first security module 101 over one or more interfaces and trusted paths that may be accessible by the ACM 301. In one example, the ACM 301 may use a memory mapped input output (MMIO) instruction to obtain the public key 205a from a device specific memory that the ACM 301 may have access to.

So, upon receiving the public portion 205a from the second security module 201, the first security module 101 may issue a challenge to the logic component 202. Upon receiving a response from the logic component 202, the first security module 101 may use the public portion 205a to verify the identity of the logic component 202. That is, the first security module may be able to verify that the second security module 201 (i.e., the second root of trust) and the logic component 202 are operating together, and that the logic component 202 may be trusted.

Figure 5:
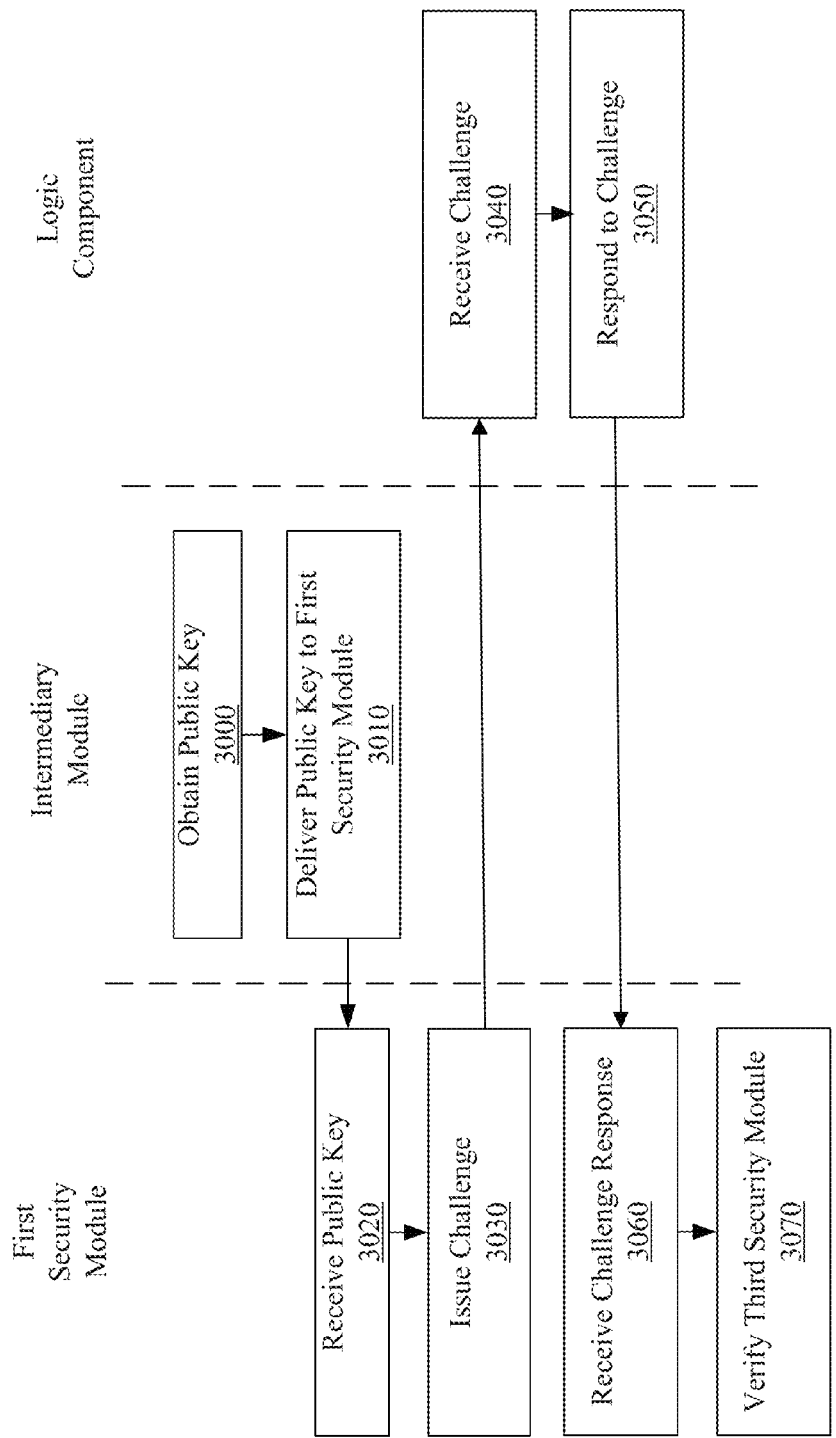
FIG. 5 is a flowchart of an example of a method of introducing a first root of trust to a second root of trust including a discrete security component according to an embodiment.

FIG. 5 is a flowchart of an example of a method of dynamically introducing a first root of trust to a second root of trust including a discrete security component. In this example, a first security module, such as the first security module 101 (FIG. 4), may constitute the first root of trust. A second security module, such as the second security module 201 (FIG. 4) may constitute a second root of trust. The second security module and a logic component, such as the logic component 202 (FIG. 4), may be separated by a firewall. An intermediary module may, such as the intermediary module 300 (FIG. 4), be configured to facilitate communication between the first security module and the second security module.

The method might be implemented as a set of logic instructions stored in a machine- or computer-readable storage medium such as, for example, RAM, ROM, PROM, firmware, flash memory, etc., in configurable logic such as PLAs, FPGAs, CPLDs, in fixed-functionality logic hardware using circuit technology such as ASIC, CMOS or TTL technology, or any combination thereof. For example, computer program code to carry out operations shown in the method may be written in any combination of one or more programming languages, including an object oriented programming language such as, for example, Java, Smalltalk, C++ or the like and conventional procedural programming languages, such as the "C" programming language or similar programming languages.

At processing block 3000, the intermediary module may use an ACM, such as the ACM 301 (FIG. 4), to obtain a public key, such as the public key 205a (FIG. 4), on behalf of the first security module. The ACM may obtain the public key from the second security module. At processing block 3010, the intermediary module may securely deliver the public key to the first security module. At processing block 3020, the first security module may receive the public key.

At processing block 3030, the first security module may direct a challenge to the logic component over a direct communication line (e.g., a system management bus). At processing block 3040, the logic component may receive the challenge. At processing block 3050, the logic component may respond to the challenge. The response may rely on a private key, such as the second key private portion 205b (FIG. 4).

At processing block 3060, the first security module may receive the challenge response from the logic component. At processing block 3070, the first security engine may verify the logic component's response utilizing the public key delivered by the ACM. At this point, the logic component may be recognized as working in conjunction with the second security module. That is, because the second security module may be configured to provide the public key exclusively to the intermediary module, the first security engine may use the response from the third security engine and the public key from the second security engine to determine that the logic component should not be treated with suspicion.

Embodiments may therefore provide an apparatus comprising an authenticated code module to obtain a first encryption key from a first root of trust on a platform using a memory mapped input output (MMIO) instruction and via a device specific memory that is dedicated to the authenticated code module. The authenticated code module is to obtain the first encryption key from a trusted platform module located in a package on a first side of a firewall, and wherein the first encryption key is to is to correspond to a private key embedded in the package on a second side of the firewall. The apparatus may also include a second root of trust to receive the first encryption key from the authenticated code module, receive a challenge response, wherein the challenge response is to be received from logic located in the package on the second side of the firewall, and use the first encryption key to verify the challenge response.

In one example, the authenticated code module is to transfer a second encryption key from the first root of trust to the second root of trust. In this example, the second root of trust may generate an attestation report based on the second encryption key and send the attestation report to an off-platform verifier.

In another example, the second root of trust is to countersign the second encryption key to obtain a countersigned encryption key, and incorporate the countersigned encryption key into the attestation report.

In another example, the second root of trust is to issue a challenge to the first root of trust over a system management bus, and wherein the challenge response is to be received over the system management bus.

Another embodiment may provide for a platform comprising a first package including a first root of trust and a second package. The second package may include an authenticated code module to obtain a first encryption key from the first root of trust, and a second root of trust to receive the first encryption key from the authenticated code module, receive a challenge response, and use the first encryption key to verify the challenge response.

In one example, the first root of trust includes a trusted platform module located on a first side of a firewall and the first package further includes logic located on a second side of the firewall. In this example, the challenge response is to be received from the logic located on the second side of the firewall.

In another example, the first package further includes a private key embedded on the second side of the firewall, and wherein the first encryption key is to correspond to the private key embedded on the second side of the firewall.

In still another example, the platform may include a device specific memory that is dedicated to the authenticated code module, wherein the authenticated code module is to obtain the first encryption key from the first root of trust via the device specific memory.

In another example, the authenticated code module is to use a memory mapped input output (MMIO) instruction to obtain the first encryption key from the device specific memory.

In yet another example, the authenticated code module is to transfer a second encryption key from the first root of trust to the second root of trust. In this example, the second root of trust may generate an attestation report based on the second encryption key and send the attestation report to an off-platform verifier.

In another example, the second root of trust is to countersign the second encryption key to obtain a countersigned encryption key, and incorporate the countersigned encryption key into the attestation report.

In still another example, the platform may include a system management bus coupled to the first root of trust and the second root of trust, wherein the second root of trust is to issue a challenge to the first root of trust over the system management bus, and wherein the challenge response is to be received over the system management bus.

Still another example may provide for an apparatus comprising an authenticated code module to obtain a first encryption key from a first root of trust on a platform, and a second root of trust to receive the first encryption key from the authenticated code module, receive a challenge response, and use the first encryption key to verify the challenge response.

In another example, the authenticated code module is to obtain the first encryption key from a trusted platform module located in a package on a first side of a firewall, and wherein the challenge response is to be received from logic located in the package on a second side of the firewall.

In still another example, the first encryption key is to correspond to a private key embedded in the package on the second side of the firewall.

In yet another example, the authenticated code module is to obtain the first encryption key from the first root of trust via a device specific memory that is dedicated to the authenticated code module.

In one example, the authenticated code module is to use a memory mapped input output (MMIO) instruction to obtain the first encryption key from the device specific memory.

In another example, the authenticated code module is to transfer a second encryption key from the first root of trust to the second root of trust. In this example, the second root of trust may generate an attestation report based on the second encryption key and send the attestation report to an off-platform verifier.

In another example, the second root of trust is to countersign the second encryption key to obtain a countersigned encryption key, and incorporate the countersigned encryption key into the attestation report.

In still another example, the second root of trust is to issue a challenge to the first root of trust over a system management bus, and wherein the challenge response is to be received over the system management bus.

Another example may provide for a method comprising using an authenticated code module to transfer a first encryption key from a first root of trust on a platform to a second root of trust on the platform, receiving a challenge response at the second root of trust, and using the first encryption key to verify the challenge response.

Still another example may include using the authenticated code module to transfer the encryption key includes obtaining the first encryption key from a trusted platform module located in a package on a first side of a firewall, and wherein the challenge response is received from logic located in the package on a second side of the firewall.

In one example, the first encryption key corresponds to a private key embedded in the package on the second side of the firewall.

In another example, using the authenticated code module to transfer the encryption key includes obtaining the first encryption key from the first root of trust via a device specific memory that is dedicated to the authenticated code module.

Another example may include using a memory mapped input output (MMIO) instruction to obtain the first encryption key from the device specific memory.

Still another example may include using the authenticated code module to transfer a second encryption key from the first root of trust to the second root of trust, generating an attestation report based on the second encryption key, and sending the attestation report to an off-platform verifier.

In another example, generating the attestation report includes countersigning the second encryption key to obtain a countersigned encryption key, and incorporating the countersigned encryption key into the attestation report.

Another example may include issuing a challenge to the first root of trust over a system management bus, wherein the challenge response is received over the system management bus.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
an authenticated code module to obtain a first encryption key from a first root of trust on a platform using a memory mapped input output (MMIO) instruction and via a device specific memory that is dedicated to the authenticated code module, wherein the authenticated code module is to obtain the first encryption key from a trusted platform module located in a package on a first side of a firewall, and wherein the first encryption key is to correspond to a private key embedded in the package on a second side of the firewall; and
a second root of trust to,
receive the first encryption key from the authenticated code module,
receive a challenge response, wherein the challenge response is to be received from logic located in the package on the second side of the firewall, and
use the first encryption key to verify the challenge response,
wherein the authenticated code module is to transfer a second encryption key from the first root of trust to the second root of trust, and the second root of trust is to generate an attestation report based on the second encryption key and send the attestation report to an off-platform verifier.

2. The apparatus of claim 1, wherein the second root of trust is to countersign the second encryption key to obtain a countersigned encryption key, and incorporate the countersigned encryption key into the attestation report.

3. The apparatus of claim 1, wherein the second root of trust is to issue a challenge to the first root of trust over a system management bus, and wherein the challenge response is to be received over the system management bus.

4. A platform comprising:
a first package including a first root of trust, wherein the first root of trust includes a trusted platform module located on a first side of a firewall and the first package further includes logic located on a second side of the firewall;

a second package including,
an authenticated code module to use a memory mapped input output (MMIO) instruction to obtain a first encryption key from the first root of trust, and
a second root of trust to receive the first encryption key from the authenticated code module, receive a challenge response, and use the first encryption key to verify the challenge response, wherein the challenge response is to be received from the logic located on the second side of the firewall; and
a device specific memory, wherein the authenticated code module is to obtain the first encryption key from the first root of trust via the device specific memory, the authenticated code module is to transfer a second encryption key from the first root of trust to the second root of trust, and the second root of trust is to generate an attestation report based on the second encryption key and send the attestation report to an off-platform verifier.

5. The platform of claim 4, wherein the first package further includes a private key embedded on the second side of the firewall, and wherein the first encryption key is to correspond to the private key embedded on the second side of the firewall.

6. The platform of claim 4, wherein the second root of trust is to countersign the second encryption key to obtain a countersigned encryption key, and incorporate the countersigned encryption key into the attestation report.

7. The platform of claim 4, further including a system management bus coupled to the first root of trust and the second root of trust, wherein the second root of trust is to issue a challenge to the first root of trust over the system management bus, and wherein the challenge response is to be received over the system management bus.

8. An apparatus comprising:
an authenticated code module to use a memory mapped input output (MMIO) instruction to obtain a first encryption key from a first root of trust on a platform via a device specific memory; and
a second root of trust to receive the first encryption key from the authenticated code module, receive a challenge response, and use the first encryption key to verify the challenge response, wherein the authenticated code module is to obtain the first encryption key from a trusted platform module located in a package on a first side of a firewall, the challenge response is to be received from logic located in the package on a second side of the firewall, the authenticated code module is to transfer a second encryption key from the first root of trust to the second root of trust, and the second root of trust is to generate an attestation report based on the second encryption key and send the attestation report to an off-platform verifier.

9. The apparatus of claim 8, wherein the first encryption key is to correspond to a private key embedded in the package on the second side of the firewall.

10. The apparatus of claim 8, wherein the second root of trust is to countersign the second encryption key to obtain a countersigned encryption key, and incorporate the countersigned encryption key into the attestation report.

11. The apparatus of claim 8, wherein the second root of trust is to issue a challenge to the first root of trust over a system management bus, and wherein the challenge response is to be received over the system management bus.

12. A method comprising:
using an authenticated code module to transfer a first encryption key from a first root of trust on a platform to a second root of trust on the platform;
receiving a challenge response at the second root of trust, wherein using the authenticated code module to transfer the encryption key includes using a memory mapped input output (MMIO) instruction to obtain the first encryption key via a device specific memory from a trusted platform module located in a package on a first side of a firewall, and wherein the challenge response is received from logic located in the package on a second side of the firewall;
using the first encryption key to verify the challenge response;
using the authenticated code module to transfer a second encryption key from the first root of trust to the second root of trust;
generating an attestation report based on the second encryption key; and
sending the attestation report to an off-platform verifier.

13. The method of claim 12, wherein the first encryption key corresponds to a private key embedded in the package on the second side of the firewall.

14. The method of claim 12, wherein generating the attestation report includes:
countersigning the second encryption key to obtain a countersigned encryption key; and
incorporating the countersigned encryption key into the attestation report.

15. The method of claim 12, further including issuing a challenge to the first root of trust over a system management bus, wherein the challenge response is received over the system management bus.

* * * * *